(12) United States Patent
Bloch et al.

(10) Patent No.: US 8,046,898 B2
(45) Date of Patent: Nov. 1, 2011

(54) FASTENER CLEARING SYSTEMS AND METHODS

(75) Inventors: Daniel D. Bloch, St. Peters, MO (US); Robert E. Bender, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 1642 days.

(21) Appl. No.: 11/253,209

(22) Filed: Oct. 18, 2005

(65) Prior Publication Data

US 2007/0084039 A1   Apr. 19, 2007

(51) Int. Cl.
- *B23P 17/00* (2006.01)
- *B23Q 7/10* (2006.01)
- *B65G 59/04* (2006.01)

(52) U.S. Cl. ....... 29/525.01; 29/809; 221/211; 221/278; 221/88; 227/112

(58) Field of Classification Search .......... 221/278, 221/88, 123, 211; 227/112; 406/191, 192, 406/86; 29/809, 525.01
See application file for complete search history.

(56) References Cited

U.S. PATENT DOCUMENTS

| | | | | |
|---|---|---|---|---|
| 2,754,860 | A * | 7/1956 | Moore et al. | 81/430 |
| 2,993,737 | A * | 7/1961 | Stephen | 406/34 |
| 3,946,926 | A * | 3/1976 | Willis | 227/112 |
| 4,747,294 | A * | 5/1988 | Schwartz et al. | 29/812.5 |
| 5,009,354 | A * | 4/1991 | D'Aquila et al. | 227/2 |
| 5,011,339 | A | 4/1991 | Aurtoi et al. | |
| 5,014,876 | A * | 5/1991 | Young et al. | 221/233 |
| 5,110,029 | A | 5/1992 | Blake | |
| 5,465,868 | A * | 11/1995 | Bonomi | 221/165 |
| 5,480,087 | A * | 1/1996 | Young et al. | 227/112 |
| 6,000,596 | A * | 12/1999 | Cariati | 227/112 |
| 6,196,414 | B1 * | 3/2001 | Ferenczi et al. | 221/123 |
| 6,264,063 | B1 * | 7/2001 | Turner et al. | 221/278 |
| 6,510,675 | B1 * | 1/2003 | Strassler | 53/490 |
| 6,511,061 | B1 * | 1/2003 | Ferenczi et al. | 271/123 |
| 6,565,496 | B1 | 5/2003 | LaPlante et al. | |
| 6,575,347 | B2 * | 6/2003 | Coonrod et al. | 227/112 |
| 6,688,489 | B2 | 2/2004 | Bloch et al. | |
| 6,772,508 | B2 | 8/2004 | Bloch et al. | |
| 6,832,431 | B2 * | 12/2004 | Bloch et al. | 29/525.01 |

(Continued)

FOREIGN PATENT DOCUMENTS

GB    2171682 A   *   9/1986

OTHER PUBLICATIONS

PCT Intl Search Report and Written Opinion for Application No. PCT/US2006/040471, dated Mar. 20, 2007, 13 pgs.

*Primary Examiner* — Essama Omgba

(57) ABSTRACT

Fastener clearing systems and methods for a fastener delivery system are provided. In one embodiment, a system includes an extractor tool having one or more vacuum generators in fluid communication with a catcher for retaining fasteners during transport. The vacuum generators are selectively activated to draw fasteners into the catcher. A backflow port is formed in the extractor tool and introduces pressurized air into the catcher to dislodge fasteners that adhere to the catcher after the vacuum generators have been deactivated. The backflow port may be formed in a fitting positioned between vacuum generators and securing the vacuum generators to one another. The vacuum generators and fitting may define a common fluid channel opening into a fastener seat adapted to receive a portion of a fastener.

18 Claims, 5 Drawing Sheets

U.S. PATENT DOCUMENTS

| | | | |
|---|---|---|---|
| 6,951,298 B1 * | 10/2005 | Cogley et al. | 227/147 |
| 6,959,835 B2 * | 11/2005 | Bloch et al. | 221/278 |
| 7,003,860 B2 * | 2/2006 | Bloch et al. | 29/407.1 |
| 7,040,506 B2 * | 5/2006 | Bloch et al. | 221/278 |
| 2003/0034355 A1 * | 2/2003 | Bloch et al. | 221/13 |
| 2005/0006427 A1 | 1/2005 | Bloch et al. | |
| 2005/0242106 A1 * | 11/2005 | Bloch et al. | 221/1 |
| 2006/0226194 A1 * | 10/2006 | Bradbury et al. | 227/119 |

\* cited by examiner

FASTENER CLEARING SYSTEMS AND METHODS

FIELD OF THE INVENTION

This invention relates generally to systems and methods for automated delivery of fasteners and, more specifically, to pneumatic fastener delivery systems.

BACKGROUND OF THE INVENTION

Automated fastener delivery systems in aeronautical applications should provide consistent operation. A typical aircraft will include thousands of fasteners, which must be installed quickly and cost-effectively. However, tools used to handle the fasteners may become fouled by contaminants, oils, or coatings that are carried by the fasteners. As a result, fasteners may adhere to tooling rather than releasing predictably. Lodged fasteners prevent consistent delivery of fasteners and cause delay when they must be removed by hand.

Fastener handling tooling using suction heads to pick up or move fasteners is particularly vulnerable to this problem. A typical suction head creates a vacuum that draws the fastener into the suction head and retains the fastener. The suction head may then be moved to another location where the vacuum is deactivated and the fastener is allowed to fall under the force of gravity. The simplicity of operation and minimal moving parts of suction heads make them very cost effective. However, when the suction head is fouled by oils or other contaminants, a fastener may remain within the grip of the suction head after the vacuum is deactivated. Accordingly, although suction heads are an effective material handling tool, there is room for improvement.

SUMMARY

The present invention is directed to methods and apparatus for automated delivery of fasteners to an installation tool. Embodiments of the invention enable consistent release of fasteners and other components from a suction head of fastener handling tooling in an automated fastener delivery system.

In one embodiment, an apparatus includes one or more fastener storage devices and an unloading mechanism in communication with the fastener storage device. The unloading mechanism includes a fastener seat having a fluid channel coupled thereto. A pneumatic control system regulates air flow between a pressurized air source and the fluid channel. The control system generates both overpressure and vacuum within the fluid channel. Vacuum may be generated by pneumatic vacuum generators in fluid communication with the fluid channel. Overpressure may be generated by releasing pressurized air into the fluid channel through a backflow port. In one embodiment, the backflow port is formed in a fitting securing first and second vacuum generators to one another.

In operation, a pneumatic control system generates a vacuum within the fluid channel to draw at least one fastener from the fastener storage device into the fastener seat. The unloading mechanism is then moved to the delivery conduit. The control system then generates overpressure within the fluid channel to expel the fastener into the delivery conduit. In some embodiments, the vacuum is first deactivated and the fastener is allowed to fall into the delivery conduit. If the fastener fails to fall, then overpressure is generated within the fluid channel to expel the fastener. Whether the fastener falls may be determined by a proximity sensor secured on or near the delivery conduit.

BRIEF DESCRIPTION OF THE DRAWINGS

Embodiments of the present invention are described in detail below with reference to the following drawings.

DETAILED DESCRIPTION

The present invention relates to systems and methods for automated delivery of fasteners to a fastener installation tool, and more specifically, to improved fastener clearing systems and methods. The present invention is suitable for use in fastener delivery systems, including the type generally disclosed, for example, in U.S. Pat. No. 6,688,489 issued to Daniel D. Bloch et al., which is incorporated herein by reference. Many specific details of certain embodiments of the invention are set forth in the following description and in FIGS. 1 through 5 to provide a thorough understanding of such embodiments. One skilled in the art, however, will understand that the present invention may have additional embodiments, or that the present invention may be practiced without one or more of the details described in the following description.

Figure 1:
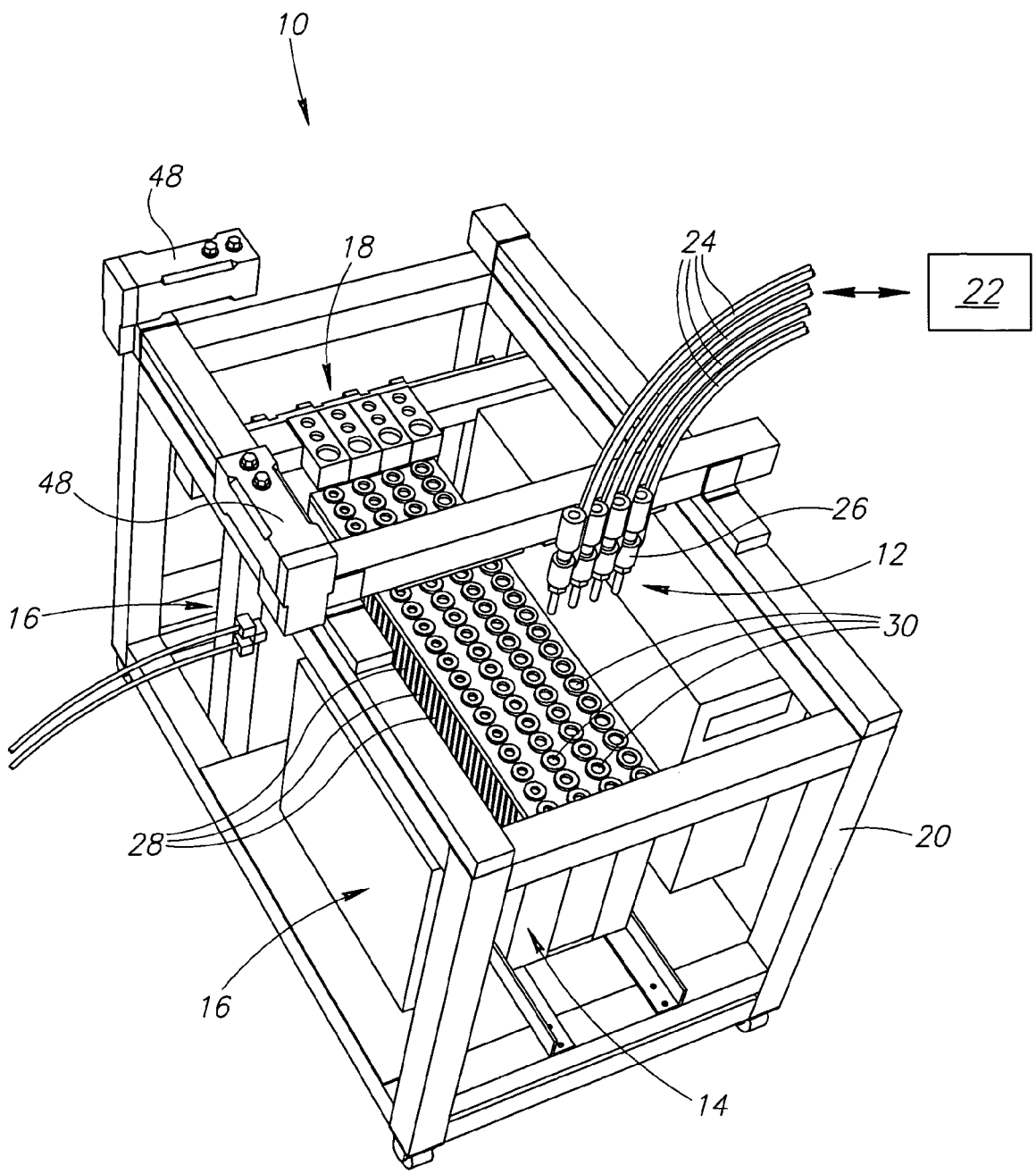
FIG. 1 is a perspective view of a portable fastener delivery system suitable for use with a fastener clearing system, in accordance with an embodiment of the present invention.

Referring to FIG. 1, a fastener delivery system 10 generally includes an unloading mechanism 12 in communication with a fastener storage device 14, wherein a control system 16 causes the unloading mechanism 12 to remove a fastener having a specific configuration from the fastener storage device 14 and transport the fastener to a delivery conduit 18, wherein the fastener is delivered to a work station. As shown, the fastener delivery system 10 may be disposed within a portable platform, such as a mobile cart 20, so that a variety of fasteners may be delivered to a plurality of work stations located throughout a manufacturing facility.

The fastener delivery system 10 generally removes and delivers fasteners using a pneumatic source 22. In one particular embodiment, the pneumatic source 22 is shop air at 90 psi (pounds per square inch). The pneumatic source 22 may be activated by the control system 16 and is in communication with both the unloading mechanism 12 and the delivery conduit 18 through flexible tubing 24. The fittings that connect the pneumatic source 22 and the flexible tubing 24 are not shown for clarity. The pneumatic source 22 activates one or a plurality of vacuum generators 26 to remove a fastener from the fastener storage device 14 and secure the fastener within the unloading mechanism 12. The fastener storage device 14 may include a plurality of tubes 28. The tubes 28 may bear seals 30 for engaging the unloading mechanism 12. Once the fastener is secured within the unloading mechanism 12, the control system positions the unloading mechanism 12 adjacent the delivery conduit 18, wherein the vacuum generators 26 are deactivated and the fastener is transported through the delivery conduit 18 by gravity and by pressurized air from the pneumatic source 22.

Figure 2:
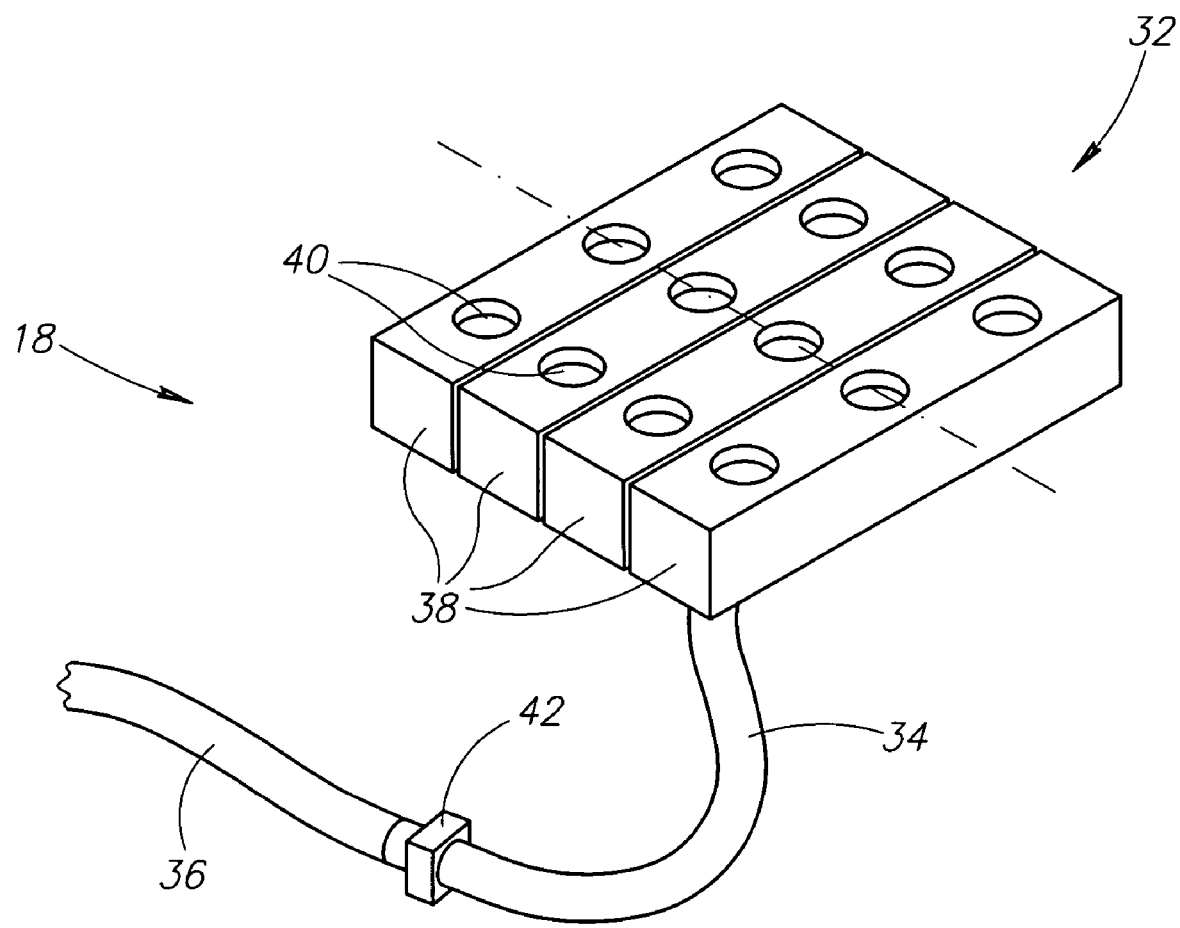
FIG. 2 is a perspective view of a delivery conduit, in accordance with an embodiment of the present invention.

Referring to FIG. 2, the delivery conduit 18 further comprises a drop station 32 in communication with a first fastener delivery tube 34 and a second fastener delivery tube 36. As shown, the drop station 32 further comprises a plurality of drop plates 38 that define chutes 40, through which the fasteners are dropped as previously described. In one particular embodiment, the chutes 40 are tapered, although a variety of shapes may be employed to effectuate transport of the fastener through the delivery conduit 18. The plurality of drop plates 38 are employed to facilitate rapid interchangeability for a variety of fastener configurations. Alternately, a single drop plate may be employed rather than the plurality of drop plates 38.

As further shown in FIG. 2, the first fastener delivery tube 34 extends from the drop station 32 and is in communication with the second fastener delivery tube 36. Generally, a fastener is transported through the first fastener delivery tube 34 by gravity until the fastener passes beyond a proximity sensor 42. When the proximity sensor 42 detects the presence of a fastener, the proximity sensor 42 notifies the control system 16, and the control system 16 then activates the pneumatic source 22 (FIG. 1). Accordingly, the pneumatic source 22 provides pressurized air through the second fastener delivery tube 36 to deliver the fastener to the work station. The workstation may include an end effector suitable for installing the fastener.

The first fastener delivery tube 34 may be rigid in order to facilitate efficient transport of the fastener by gravity. Accordingly, in one particular embodiment, the first fastener delivery tube 34 is fabricated from aluminum tube stock or other rigid material commonly known in the art. The second fastener delivery tube 36 may be flexible so that the fastener may be delivered to a plurality of work stations throughout a manufacturing facility. Accordingly, the length of the second fastener delivery tube 36 may be varied to accommodate the required distance from the portable fastener delivery system 10 to the work station. The amount of time that the pneumatic source 22 provides pressurized air through the second fastener delivery tube 36 is a function of the length of the delivery tube and the fastener configuration being delivered, and therefore, the amount of time that pneumatic source 22 is activated must be adjusted according to the length of the second fastener delivery tube 36.

Additionally, the inner diameter of the second fastener delivery tube 36 should be sized appropriately to prevent tumbling of the fastener along the length thereof, which is generally a function of the overall size of the fastener. Generally, the inner diameter of the second fastener delivery tube 36 may desirably be slightly larger than the diameter of the fastener head yet smaller than the overall length of the fastener to prevent tumbling. Further, the second fastener delivery tube 36 may be fabricated from relatively soft and flexible plastic such as nylon with a relatively smooth inner surface to minimize friction between the fastener and the inner wall of the second fastener delivery tube 36.

Figure 3:
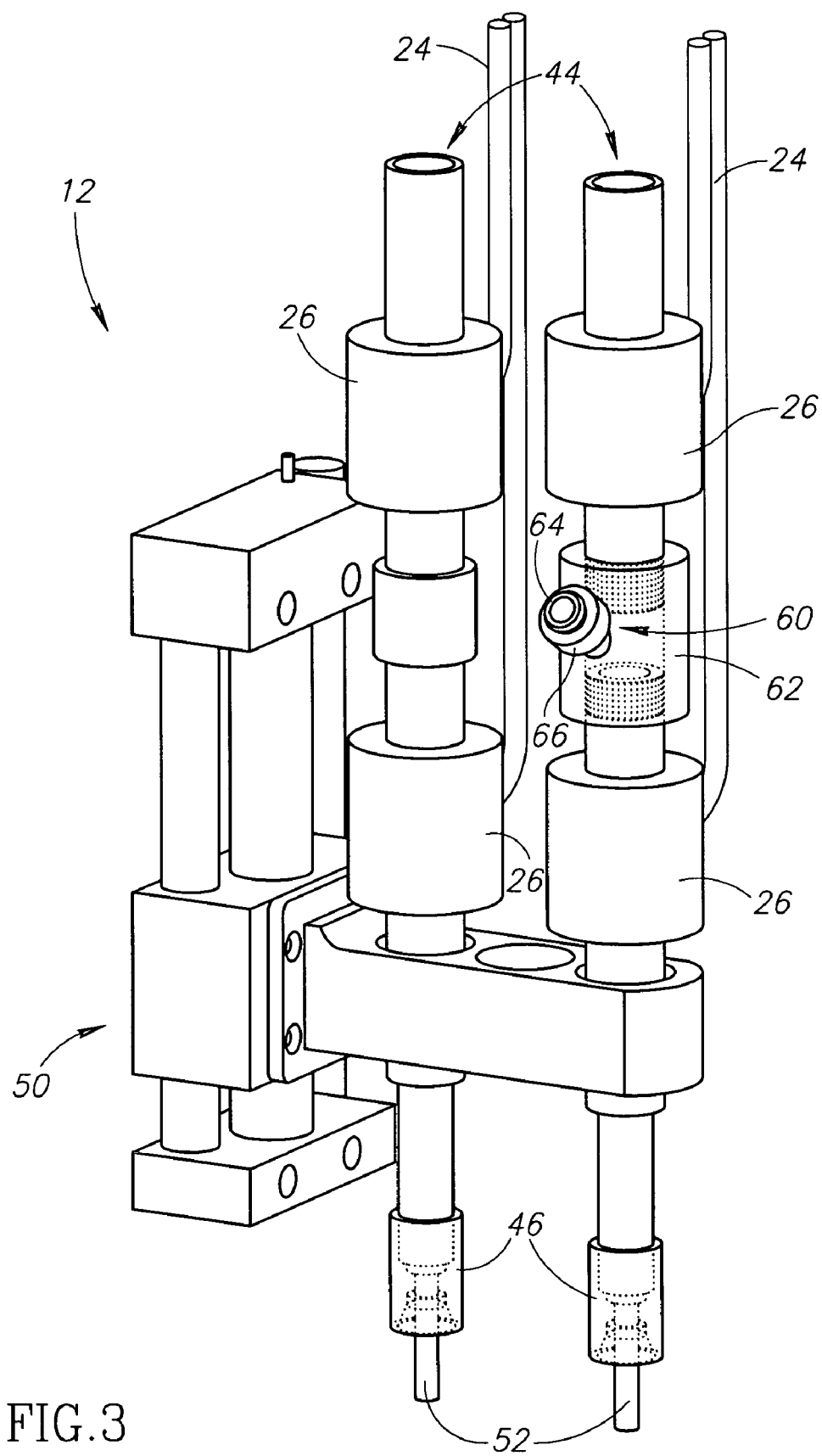
FIG. 3 is a perspective view of an extractor mechanism, in accordance with an embodiment of the present invention.

Referring to FIG. 3, the unloading mechanism 12 generally comprises an extractor tool 44 having an extractor catcher 46 attached thereto. As further shown, in this embodiment, the vacuum generators 26 are disposed at an upper end of the extractor tool 44 and the extractor catcher 46 is disposed at a lower end of the extractor tool 44.

Although two (2) extractor tools 44, each having two (2) vacuum generators 26, are illustrated herein, the portable fastener delivery system 10 according to the present invention may comprise any number of extractor tools 44 and vacuum generators 26 to remove fasteners in accordance with specific operating requirements. Therefore, the illustrated embodiment which uses two (2) extractor tools 44 with two (2) vacuum generators 26 each should not be construed as limiting the scope of the present invention.

Generally, the unloading mechanism 12 is positioned adjacent the fastener storage device 14 using a linear X-Y positioner 48 that is activated by the control system 16 (FIG. 1). More specifically, the linear X-Y positioner 48 positions an extractor catcher 46 of the unloading mechanism 12 (FIG. 3) adjacent the appropriate fastener storage tube 28 that contains the requested fastener. Accordingly, the X and Y position of each fastener storage tube 28 is stored within the control system 16 as described in greater detail below. Additionally, the extractor tool 44, along with the extractor catcher 46 attached thereto, may be translated in the vertical direction with a vertical axis positioner 50 as shown. The extractor catcher 46 is translated in the vertical direction in order to engage the extractor catcher 46 with the fastener storage tube 28 for removal of the requested fastener as described in further detail below. Moreover, the vertical axis positioner 50 may be pneumatically controlled and is therefore activated by the pneumatic source 22.

In operation, the control system 16 activates the linear X-Y positioner 48 to position the unloading mechanism 12 adjacent the fastener storage device 14, and more specifically, to position an extractor catcher 46 adjacent the appropriate fastener storage tube 28. Once the proper extractor catcher 46 is positioned adjacent the appropriate fastener storage tube 28, the vertical axis positioner 50 moves the extractor tool 44 in the vertical direction until the extractor catcher 46 abuts the seal 30.

Figure 4:
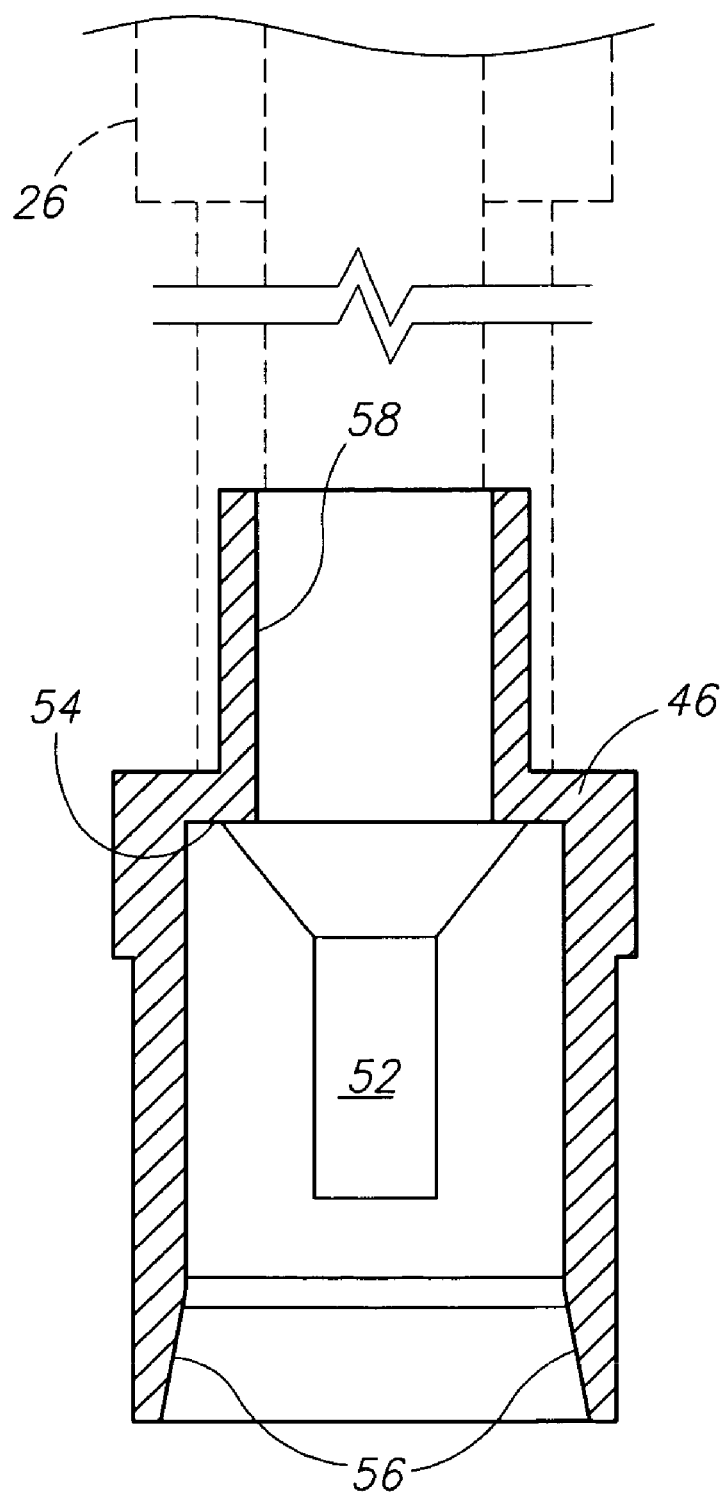
FIG. 4 is a side view of an extractor catcher, in accordance with an embodiment of the present invention.

Referring to FIGS. 3 and 4, once the extractor catcher 46 is positioned against the seal 30 of the appropriate fastener storage tube 28, the pneumatic source 22 (not shown) then activates the vacuum generators 26, and as a result, one or more of the fasteners 52 within the fastener storage tube 28 move up against the extractor catcher 46. Once the head of a top fastener 52 abuts the extractor catcher 46 as shown, a seal may be created at the interface between the top fastener 52 and the extractor catcher 46, thereby causing the remaining fasteners 52 to drop back into the fastener storage tube 28. As a result, the unloading mechanism 12 removes the top fastener 52 from the fastener storage device 14 without the need for a separate fastener escapement mechanism.

As shown in FIG. 4, the fastener 52 abuts an upper surface 54 of the extractor catcher 46, and may create a sealed (or at least partially sealed) connection therebetween. In operation, the at least partially sealed connection causes the remaining fasteners to drop back into the fastener storage tube. As further shown, the extractor catcher 46 also comprises a tapered inner surface 56 to further facilitate ease of removal of the fastener 52 from the fastener storage device 14. The upper surface 54 of the extractor catcher 46 may be modified to accommodate various types of fastener heads. A channel 58 opens into the upper surface 54 of the extractor catcher 46 and is in fluid communication with the vacuum ports of the vacuum generators 26.

In some applications and conditions, the fastener 52 may tend to adhere to the surface 54. Adhesion may be caused, for example, by contaminants such as oil or dust within the extractor catcher 46. Adhesion may also result from coatings applied to a fastener 52, such as a cetyl alcohol coating applied to prevent galvanic corrosion at interfaces between dissimilar metals. Where adhesion occurs, gravity may be insufficient to dislodge the fastener 52 from the extractor catcher 46.

As further shown in FIG. 3, the extractor tool 44 may include a backflow port 60 fluidly coupled to the upper surface 54 of the extractor catcher 46. The blackflow port 60 may be coupled to a source of pressurized gas. For example, in one particular embodiment, one of the flexible tubes 24 may connect the backflow port 60 to the pneumatic source 22. When a fastener lodges in the extractor catcher 46, pressurized air may be released through the backflow port 60 to remove the fastener. In some embodiments, pressurized air is automatically and systematically released to ensure release of each fastener 52 each time the vacuum is released to release the fastener 52 from the extractor catcher 46. Alternately, in other embodiments, pressurized air is released through the backflow port 60 only in instances where the fastener 52 fails to fall from the extractor catcher 46. In either case, the control system 16 typically regulates the release of air through the backflow port 60.

In the illustrated embodiment, the backflow port 60 is formed in a fitting 62 (FIG. 3) which secures the two vacuum generators 26 to one another. Forming the port 60 in the fitting 62 eliminates the need for separate parts for the port 60 and for securing the vacuum generators 26 to one another thereby making the extractor tool 44 more compact. The backflow port 60 may be embodied as an aperture 64 formed in the fitting 62 and a nozzle 66, or other such fitting, secured thereto for connecting to the pneumatic source 22. In one embodiment, the aperture 64 slopes downwardly through the fitting 62, as shown in FIG. 3.

Various arrangements of the vacuum generators 26 and fitting 62 are possible. For example, a single vacuum generator 26 may be used. The fitting 62 having the port 60 formed therein may be disposed above or below the vacuum generator 26 (or generators 26). The vacuum generators 26 and fitting 62 may form a continuous channel opening into the upper surface 54 of the extractor catcher 46. Alternatively, the backflow port 60 may include a separate channel independently connected to the upper surface 54.

In some embodiments, each extractor tool 44 includes a backflow port 60. In others, such as the illustrated embodiment, extractor tools 44 both with and without backflow ports 60 are used. Such embodiments may be practical where multiple types of fasteners are being handled but not all tend to adhere to the extractor catcher 46.

Figure 5:
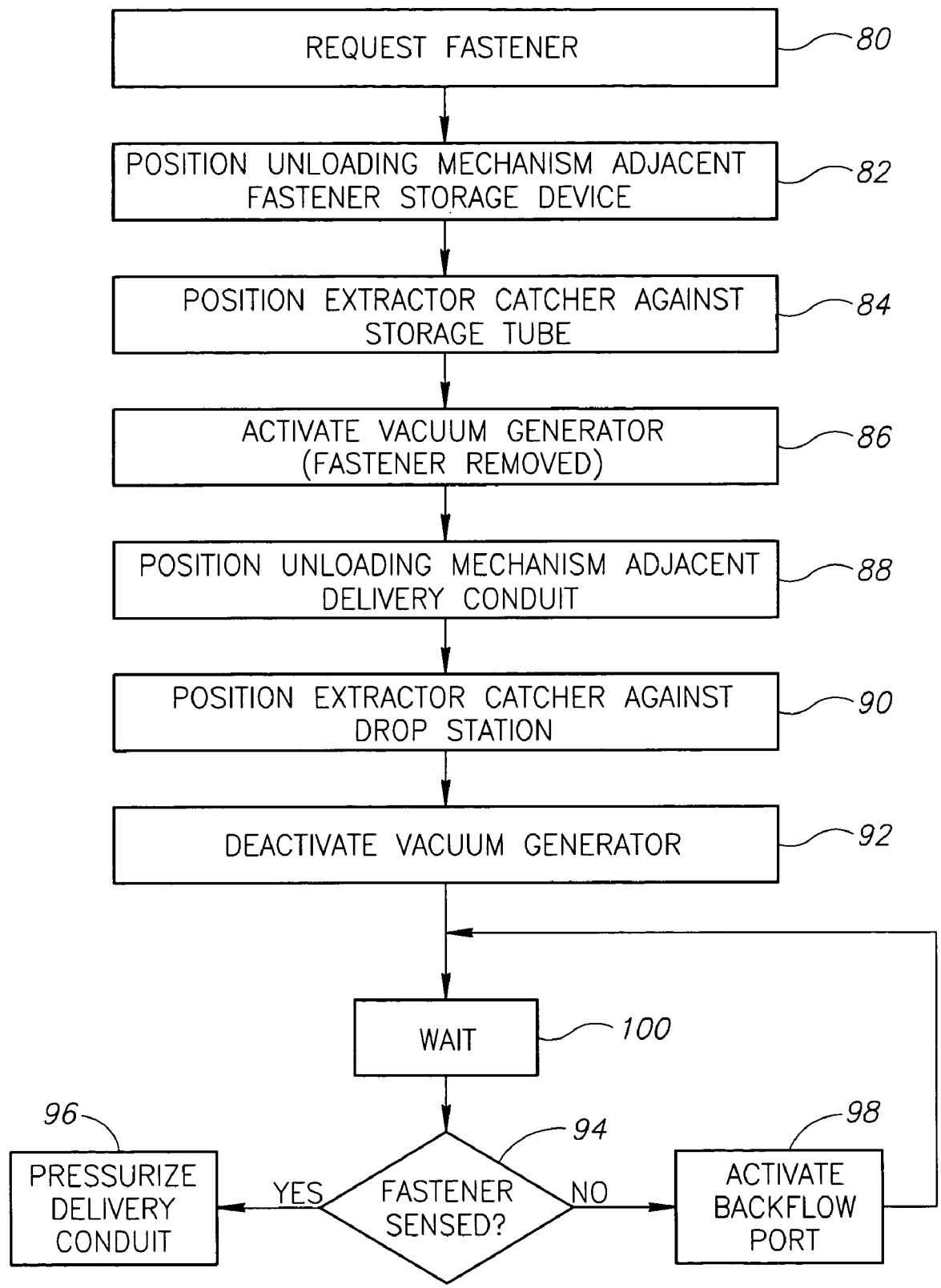
FIG. 5 is a process flow diagram of a method for using a fastener clearing system, in accordance with an embodiment of the present invention.

FIG. 5 illustrates a method for using a fastener delivery system 10 in accordance with an embodiment of the invention. At block 80, the control system 16 receives a request for a specific fastener configuration and identifies, through the execution of control software within a computing device (not shown), which fastener storage tube 28 within the fastener storage device 14 contains the proper fastener. At block 82, the control system activates the linear X-Y positioner 48 to position the unloading mechanism 12 in the proper X-Y position adjacent the fastener storage device 14, and more specifically, to position the extractor catcher 92 adjacent the appropriate fastener storage tube 28.

Once the extractor tool 44 is properly positioned, block 84 includes activating the pneumatic source 22 to cause the vertical axis positioner 50 to force the extractor catcher 46 down against the seal 30 disposed around the fastener delivery tube 28. When the extractor catcher 46, or other sealing structure such as the shroud 94 disclosed in U.S. Pat. No. 6,688,489, abuts the seal 30, block 86 is executed, activating the vacuum generator 26 to cause at least one of the fasteners within the fastener storage tube 28 to move upward against the extractor catcher 46. When the top fastener abuts the upper surface 54 of the extractor catcher 46, a seal is at least partially formed therebetween and the remaining fasteners (if any) fall back down into the fastener storage tube 28.

In block 88, the control system 16 positions the unloading mechanism 12 over the delivery conduit 18. Block 88 may therefore include activating the vertical axis positioner 50 to move the extractor tool 44 up and away from the fastener storage device 14 and activating the linear X-Y positioner 48 to position the unloading mechanism 12 in the appropriate X-Y position adjacent the delivery conduit 18. More specifically, the linear X-Y positioner 48 positions the extractor catcher 46 adjacent the appropriate chute 40 of the drop plate 38. Block 90 may include causing the pneumatic source 22 to activate the vertical axis positioner 50 to force the extractor catcher 46 down against the drop plate 38. The extractor catcher 46 and drop plate 38 may form an air tight seal at their contacting surfaces. Alternatively, Block 90 may be omitted and the fastener dropped upon deactivation of the vacuum generator 26 at block 92.

At block 92, the vacuum generator 26 is deactivated and the fastener is allowed to drop into the first fastener delivery tube 34. Accordingly, the fastener is transported through the first fastener delivery tube 34 by gravity. At block 94, the control system 16 evaluates whether the fastener has fallen from the extractor catcher 45. In one embodiment, this occurs as the fastener is transported through the first fastener delivery tube 34 by gravity and past the proximity sensor 42 into the second fastener delivery tube 36. If the fastener is sensed, then the method proceeds to block 96. In other embodiments, block 94 may include evaluating the output of a sensor capable of sensing the fastener positioned on the drop plate 38, within the extractor catcher 46, or at another point along the path of the fastener. At block 96, the control system 16 activates the pneumatic source 22 to provide pressurized air through the second fastener delivery tube 36 to deliver the fastener to a work station.

If the fastener is not sensed, then block 98 is executed. At block 98 the back flow port 60 is activated, permitting air to flow through the backflow port 60 for one or more short bursts (or continuously). Bursts approximately one second in length have been shown to be effective to dislodge some fasteners. The air flowing through the backflow port may have any pressure effective to dislodge the fastener. Shop air at 90 psi or reduced to pressures from 60 to 80 psi has been shown to be effective. After releasing a burst of air (or continuous flow of air) through the backflow port 60, block 94 may be reexecuted to evaluate whether the fastener has dislodged from the extractor catcher 46. Blocks 94 and 98 may be executed repeatedly until release of the fastener has been sensed at block 94 or a specific number of iterations have occurred. After the fastener is sensed at block 94, the delivery conduit may be pressurized at block 96 to deliver the fastener to the work station. The method may then return to block 80 and be repeated, or the method may terminate.

In some embodiments, a block 100 may be executed before block 94. Block 100 may include waiting for a period of time before evaluating whether the fastener has been released from the extractor catcher 46. The amount of time may approximate the expected amount of time for a fastener to fall through the first fastener delivery tube 34 from the extractor catcher 46 to a point near the proximity sensor 50.

Various alternative embodiments of the method of FIG. 5 are possible. In some embodiments, for example, the step of releasing air through the backflow port 60 at block 98 may be executed for each iteration of the method, rather than only in instances where a fastener fails to fall due to gravitational forces. In other embodiments, blocks 96 and 98 may be combined. In such embodiments, pressurized air released from the backflow port 60 may serve both to dislodge fasteners from the upper surface 52 and to force the fastener along the first fastener delivery tube 34, the second fastener delivery tube 36, or both.

Embodiments of the present invention may provide significant advantages over the prior art. For example, by sensing the passing of a fastener into the second fastener delivery tube, embodiments of the invention ensure that those fasteners which adhere within the extractor catcher are promptly detected so that appropriate action may be taken. Further, embodiments of the invention provide a backflow port which allow a fast, efficient, and cost effective means of dislodging fasteners which adhere within the extractor catcher. Thus, embodiments of the invention advantageously enable consistent release of fasteners and other components from a suction head of an automated fastener delivery system, thereby improving the efficiency and reducing costs of the manufacturing operation.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method for using a component delivery system to deliver fabrication components, the system including a delivery conduit, a component storage device, and an unloading mechanism having an extractor catcher, and a back flow port in fluid communication with an upper surface of the extractor catcher the method comprising:
   creating a vacuum within the extractor catcher to draw a component from the component storage device into the extractor catcher;
   positioning the unloading mechanism adjacent to the delivery conduit;
   deactivating the vacuum and allowing the component to fall into the conduit by gravity; and
   creating an overpressure in the extractor catcher to ensure that the component is released from the unloading mechanism and falls into the delivery conduit, wherein creating the overpressure includes supplying pressurized air to the back flow port.

2. The method of claim 1, further comprising evaluating whether the component has passed into the delivery conduit and creating the overpressure if the component has not passed into the delivery conduit.

3. The method of claim 2, wherein evaluating whether the component has passed into the delivery conduit includes detecting proximity of the component to the delivery conduit.

4. The method of claim 2, wherein evaluating whether the component has passed into the delivery conduit comprises detecting proximity of the component to the catcher.

5. The method of claim 1, wherein the overpressure is created automatically and systematically.

6. The method of claim 5, wherein the overpressure is created after both deactivating the vacuum and evaluating passage of the component.

7. The method of claim 1, wherein the component is a fastener.

8. The method of claim 1, further comprising transporting the component along the delivery conduit to an end effector.

9. The method of claim 1, wherein the extractor catcher includes a component seat adapted to engage a component, and wherein creating an overpressure includes releasing pressurized air between the component and the component seat.

10. The method of claim 1, wherein the vacuum is also used to lift a component stack in the storage device, wherein a component is drawn off the stack by the extractor catcher, and wherein remaining components in the stack drop back after the drawn component enters and seals the catcher.

11. A method for using a component delivery system to deliver fabrication components, the system including an unloading mechanism and a component storage device, the unloading mechanism including an extractor catcher a back flow port in fluid communication with an upper surface of the extractor catcher, the method comprising
   positioning the unloading mechanism adjacent the component storage device;
   creating a vacuum within the unloading mechanism;
   drawing a component from the component storage device into the extractor catcher;
   positioning the unloading mechanism adjacent at least one delivery conduit; and
   supplying pressurized air to the back flow port to create an overpressure in the extractor catcher proximate the component to release the component into the delivery conduit, wherein creating an overpressure occurs after deactivating the vacuum, waiting for a delay period, and evaluating passage of the component.

12. The method of claim 11, wherein the fabrication components include fasteners.

13. The method of claim 11, further comprising transporting the component along the delivery conduit to an end effector.

14. The method of claim 11, wherein evaluating passage includes detecting proximity of the component to the delivery conduit.

15. The method of claim 14, wherein the extractor catcher includes a component seat adapted to engage a component, and wherein after the overpressure is created pressurized air between the component and an upper surface of the component seat is released.

16. The method of claim 11, wherein the vacuum is also used to lift a component stack in the storage device, wherein a component is drawn off the stack by the extractor catcher, and wherein remaining components in the stack drop back after the drawn component enters and seals the catcher.

17. The method of claim 16, wherein evaluating passage includes detecting proximity of the component to the catcher.

18. A method for using a component delivery system to deliver fabrication components, the system including an unloading mechanism and a component storage device, the unloading mechanism including an extractor catcher and a back flow port in fluid communication with an upper surface of the extractor catcher, the method comprising
   positioning the unloading mechanism adjacent the component storage device;
   creating a vacuum within the extractor catcher;
   drawing a component from the component storage device into the unloading mechanism;
   positioning the unloading mechanism adjacent at least one delivery conduit;
   releasing the vacuum and supplying pressurized air to the back flow port to create an overpressure on the upper surface of the extractor catcher to release the component into the delivery conduit;
   evaluating passage of the component; and
   if the evaluating indicates that the component has not passed, repeating the creating an overpressure and the evaluating passage of the component.

* * * * *